United States Patent
Seichter et al.

(10) Patent No.: US 8,028,570 B2
(45) Date of Patent: Oct. 4, 2011

(54) METHOD FOR TESTING TIRES

(75) Inventors: Wolfgang Seichter, Hannover (DE); Michael Meinen, Nordstemmen (DE)

(73) Assignee: Seichter GmbH, Hannover (DE)

( * ) Notice: Subject to any disclaimer, the term of this patent is extended or adjusted under 35 U.S.C. 154(b) by 564 days.

(21) Appl. No.: 12/086,660

(22) PCT Filed: Feb. 23, 2007

(86) PCT No.: PCT/DE2007/000344
§ 371 (c)(1), (2), (4) Date: Jun. 17, 2008

(87) PCT Pub. No.: WO2007/095930
PCT Pub. Date: Aug. 30, 2007

(65) Prior Publication Data
US 2009/0158834 A1    Jun. 25, 2009

(30) Foreign Application Priority Data

Feb. 23, 2006 (DE) .......................... 10 2006 008 983

(51) Int. Cl.
*G01M 17/02* (2006.01)
(52) U.S. Cl. ....................................................... 73/146
(58) Field of Classification Search .................. None
See application file for complete search history.

(56) References Cited

U.S. PATENT DOCUMENTS

| | | | |
|---|---|---|---|
| 3,518,878 A * | 7/1970 | Cooper et al. ................. | 73/146 |
| 3,534,598 A * | 10/1970 | Cooper et al. ................. | 73/146 |
| 3,543,576 A * | 12/1970 | Bishop ............................ | 73/146 |
| 4,458,526 A * | 7/1984 | Doi et al. ........................ | 73/146 |
| 6,718,818 B2 * | 4/2004 | Dutt et al. ....................... | 73/49 |
| 2003/0196483 A1 | 10/2003 | Beebe et al. | |

OTHER PUBLICATIONS

International Search Report, Dec. 20, 2007.

* cited by examiner

*Primary Examiner* — Lisa Caputo
*Assistant Examiner* — Jermaine Jenkins
(74) *Attorney, Agent, or Firm* — Collard & Roe, P.C.

(57) ABSTRACT

The invention relates to a method for testing tires, for measuring the radial and lateral forces which the tires of motor vehicles will exert on a road. According to the method, a load-application wheel is forced with a predetermined force against the tread of the tire which is filled with air, the tire rolling off on the load-application wheel. The test is carried out in both rotational directions of the tire. After the first test the rotational direction is changed and the second test is carried out. The method is characterized in that the force with which the load-application wheel is forced against the tread of the tire is reduced during change of the rotational direction.

4 Claims, 1 Drawing Sheet

METHOD FOR TESTING TIRES

CROSS REFERENCE TO RELATED APPLICATIONS

Figure 1:
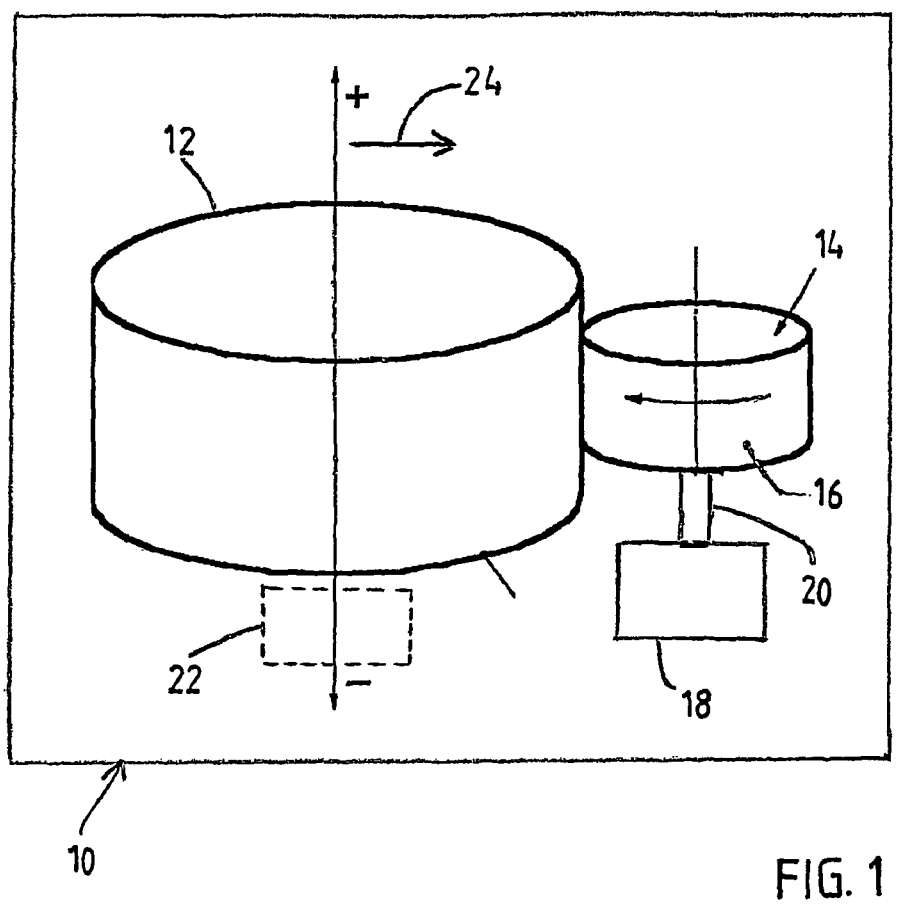

This application is the National Stage of PCT/DE2007/000344 filed on Feb. 23, 2007, which claims priority under 35 U.S.C. §119 of German Application No. 10 2006 008 983.9 filed on Feb. 23, 2006. The international application under PCT article 21(2) was not published in English.

The invention relates to a method for testing tires according to the preamble of patent claim 1.

It is known to test tires after their manufacture in order to measure the radial and lateral forces, which the tires of motor vehicles will exert on a road. The testing machine used for the purpose is referred to in expert circles as a "tire uniformity machine".

In the known method with a testing machine, a load wheel is pressed with a defined force against the running face of the tire, which is filled with air and rolls at a defined speed on the load wheel. As the running face of the tire rolls on the load wheel, the radial force variation and the lateral force variation of the tire are measured. This measurement takes place in both directions of rotation of the tire, once in the clockwise direction and once in the anti-clockwise direction. The measurement cycle then ends, and a new measurement cycle with the next tire follows.

In the known method, a disadvantageous property of tires is to be taken in account, which consists in that the tires, depending on their material, have the property of forming as impressions on the tire surface flat areas, which deviate from the round shape, and that these impressions are retained for a certain time. This effect is known in expert circles as "flat spot". If, for example, a motor vehicle is not moved for a relatively long time, the impression in the form of a flat spot forms on the standing face of the tire. This flat spot causes a force variation when the tire rolls on the road. As a rule, this effect is balanced out when the motor vehicle has been driven for a few kilometers and the tire has made the corresponding number of revolutions.

This effect also occurs in the known methods for testing tires. Both during the setting of the load, when the load wheel is pressed against the running face of the tire, and during changing of the direction of rotation, a certain flat spot and non-uniformity is impressed on the running face of the tire. In order to keep the undesired effect, which is caused by this during the measurement of the lateral and radial forces, low, it is necessary in the testing machines used to include a few revolutions of the tire under load in the measurement cycle before the respective actual measurement run. A certain rest time is therefore necessary to allow the impression to balance out. No measurements can be carried out during this rest time.

The additional rest time, which is necessary owing to the described effect, is to be considered disadvantageous because the rate of use of the testing machine is limited thereby, because no measurement of the tire can be carried out during the rest time itself. In this connection it must be taken into account that purchasing a testing machine is very expensive. The user of a testing machine is therefore concerned with keeping the duration of a measurement cycle as short as possible in order to be able to carry out as many tests as possible within a period of for example a year and in order to achieve a high rate of use of the expensive testing machine. The rate of use is limited considerably however by the unavoidable rest time.

This disadvantage should be eliminated by the invention, which concerns itself with the disadvantageous effect during the change in direction of rotation and is based on the object of creating a new method for testing tires, which makes possible an improvement of the rate of use of the testing machine.

This object is achieved in the method specified in the preamble of patent claim 1 in that the force with which the load wheel presses against the running face of the tire is reduced during the change in the direction of rotation.

As described above, a non-uniformity is impressed in the running face of the tire during the change in direction of rotation. Since in the invention the force with which the load wheel is pressed against the running face of the tire is however reduced during the change in the direction of rotation, the non-uniformity on the running face of the tire is also substantially smaller and almost negligibly small for the measurement in the second direction of rotation, which follows the change in the direction of rotation. The necessary rest time can therefore also be kept correspondingly smaller. This allows a shorter time for the entire measurement cycle in the testing machine, with more constant measurement results. The rate of use of the testing machine is thus increased.

In an expedient embodiment of the invention, the force with which the load wheel is pressed against the running face of the tire is reduced by the distance between the load wheel and the tire being increased during the change in the direction of rotation.

When the load wheel is moved onto the running face of the tire at the start of the test, the predefined force and thus the load must first be quickly adjusted, and when the predefined force is reached, the mutual distance between the axes of the load wheel and the tire is produced. After the setting of the load between the tire and the load wheel is complete, the mutual distance is suitable for setting the same load again after the change in the distance without adjusting the force and thus the load again. The air pressure of the tire is kept constant.

In an advantageous development, the force with which the load wheel is pressed against the running face of the tire is reduced by the air pressure of the tire being reduced during the change in the direction of rotation. In this case the distance between the load wheel and the tire is kept constant. As soon as the tire air pressure has been brought back to the original value, the original load for the measurement is re-established in the other direction of rotation.

It has proved expedient to reduce the force with which the load wheel is pressed against the running face of the tire by approximately 80% during the change in the direction of rotation. In any case it is critical for the size of the reduction that a sufficient friction force is still present between the load wheel and the tire to execute the change in the direction of rotation.

The invention is explained in more detail by way of example below, using the drawing. In the figures, FIG. 1 shows a schematic diagram of a testing machine with a load wheel and a tire, and FIG. 2 shows the profile of the force during the change in the direction of rotation.

Figure 2:
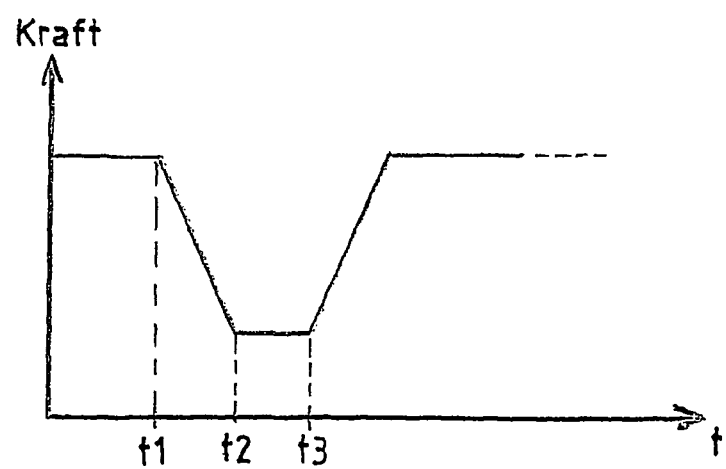

FIG. 1 shows in a schematic diagram a testing machine 10 with a load wheel 12 and a tire 14 to be tested. The radial and lateral forces, which the tire 14 will exert on a road, are measured with the testing machine 10. The measurement of the radial and lateral forces takes place at the load wheel 12 with the aid of a measurement apparatus 22, which is known per se.

To test the tire 14, the load wheel 12 is pressed with a predefined force in the direction of the arrow 24 against the running face 16 of the tire 14, which is mounted fixedly and filled with air. The tire 14 is driven by a motor (not shown) and moved in a first direction of rotation.

The pressing force, that is, the force with which the load wheel 12 is pressed against the running face 16 of the tire 14, is approximately 3000-5000 N (Newtons). This corresponds approximately to the conditions to which the tire is subjected, taking into account the weight of a motor vehicle. The speed at which the tire 14 moves during the measurement of the radial and lateral forces is normally 60 revolutions per minute. As a result of the pressing force, the running face 16 of the tire 14 is pressed in by approximately 20 mm.

Before the testing of the tire 14 is carried out, the tire 14 is filled with air by means of a central filling support 22, which is connected to an air container 18. Within approximately one second, the air pressure in the tire rises from 0 to 4 bar so that the tire 14 rests securely on its associated rim, which is not shown in detail in FIG. 1, and then the air pressure in the tire 14 is reduced within approximately half a second to 2 bar, with a precision of 1 millibar. The air pressure of 2 bar corresponds approximately to the conditions to which the tire to be tested is subjected later in practice.

FIG. 2 shows that the force with which the load wheel 12 is pressed against the running face 16 of the tire 14 is reduced during the change in the direction of rotation. The change in direction of rotation begins at the time t1, and from this time onwards the force is reduced to approximately 20% of the original value. The force reaches this value at the time t2, that is, shortly before the change in the direction of rotation, which occurs at the time t3.

From the time t3 onwards, the tire 14 begins to move in the other direction of rotation, and the force is then increased back to the original value. To reduce the force during the change in the direction of rotation, the mutual distance between the load wheel 12 and the tire 14 can be increased on the one hand, and on the other hand it is also possible to reduce the air pressure of the tire 14 during the change in direction of rotation. In both cases the same desired effect occurs that the rest time before the respective measurement is reduced.

It could be established using experiments that the duration of a usual measurement cycle of 20 seconds can be reduced by approximately 1-2 seconds. The rest time, which is necessary in any case during the change in the direction of rotation, can be reduced for example from 4 revolutions to 3 revolutions, depending on the tire to be tested.

The reduction of approximately 1-2 seconds or one revolution does not appear all that great at first glance, but when one takes into account that the testing machine is as a rule in use day and night without interruption and is used for a plurality of years, the advantage of the invention becomes immediately clear. On the whole, a considerable improvement in the rate of use of the testing machine is achieved by the method according to the invention.

The invention claimed is:

1. A method for testing tires in order to measure the radial and lateral forces, which the tires of motor vehicles will exert on a road, wherein a load wheel is pressed with a selectable predefined force against the running face of the tire, which is filled with air and rolls at a selectable predefined speed on the load wheel, wherein the radial and lateral force variation of the tire is measured, and wherein the testing takes place in both possible directions of rotation of the tire, in that after the first test the direction of rotation of the tire is changed and then the second test is carried out, wherein the force with which the load wheel is pressed against the running face of the tire is reduced during the change in the direction of rotation, whereby a sufficient friction force is present between the load wheel and the tire in order to execute the change in the direction of rotation.

2. The method according to claim 1, wherein the force is reduced by the distance between the load wheel and the tire being increased during the change in the direction of rotation.

3. The method according to claim 1, wherein the force is reduced by the air pressure of the tire being reduced during the change in the direction of rotation.

4. The method according to claim 1, wherein the force is reduced by approximately 80%.

* * * * *